No. 793,992. PATENTED JULY 4, 1905.
A. S. COWAN.
FRICTION PULLEY MECHANISM.
APPLICATION FILED APR. 22, 1904.
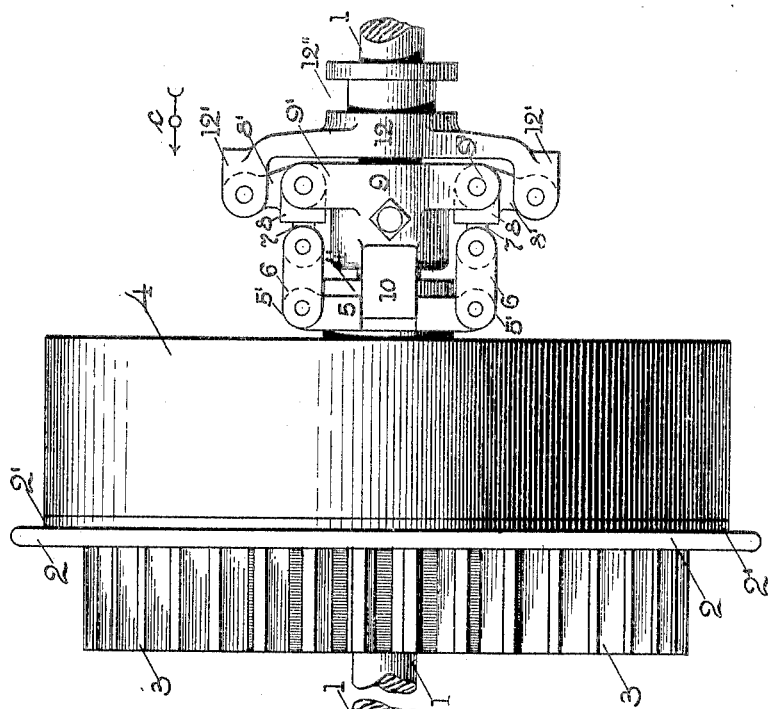
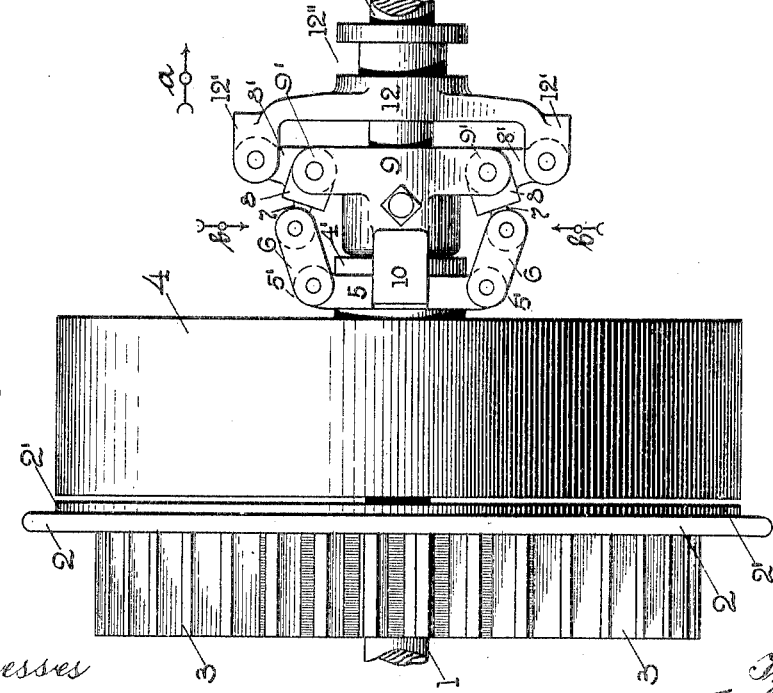
Witnesses
H. M. Rugg
M. Breder
Inventor
A. S. Cowan
By John C. Dewey.
Attorney No. 793,992. Patented July 4, 1905.

UNITED STATES PATENT OFFICE.

ARTHUR S. COWAN, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

FRICTION PULLEY MECHANISM.

SPECIFICATION forming part of Letters Patent No. 793,992, dated July 4, 1905.

Application filed April 22, 1904. Serial No. 204,311.

*To all whom it may concern:*

Be it known that I, ARTHUR S. COWAN, a citizen of the United States, residing at Worcester, in the county of Worcester and State of Massachusetts, have invented certain new and useful Improvements in Friction Pulley Mechanism, of which the following is a specification.

My invention relates to a friction-pulley, and more particularly to the mechanism which moves a pulley and a plate or disk on a shaft into and out of frictional engagement with each other.

The object of my invention is to improve upon the construction of friction mechanism for friction-pulleys and other friction devices as ordinarily made and to provide a mechanism of simple construction and operation which will positively move a friction-pulley and a friction plate or disk into and out of frictional engagement with each other and act to lock them in engagement with each other.

My invention consists in certain novel features of construction of my improvements, as will be hereinafter fully described.

I have shown in the drawings my improvements in friction mechanism combined with a belt-pulley loose on a shaft and to be moved into and out of frictional engagement with a plate fast on the shaft and having a gear attached thereto; but the pulley may be fast on the shaft and the friction-plate loose on the shaft, if preferred, and my improvements may be used with any other friction mechanism, if desired.

Referring to the drawings, Figure 1 is an edge view of a gear and friction plate and a belt-pulley and my improvements combined therewith, showing the pulley locked in engagement with the friction-plate. Fig. 2 corresponds to Fig. 1, but shows the pulley disengaged from the friction-plate.

In the accompanying drawings, 1 is a rotary shaft.

2 is a friction plate or disk, in this instance fast on the shaft 1 and having in this instance a gear 3 attached to one side thereof. To the other side of the friction-plate 2 is preferably attached a ring 2', preferably of yielding material, as leather, to be engaged by the inner edge or rim of the pulley 4. The pulley 4, shown in this instance as a belt-pulley, is in this instance loose on the shaft 1.

I will now describe my improvements in friction mechanism for moving the pulley 4 on the shaft 1 into and out of engagement with the plate 2.

The hub 4' of the pulley 4 has an external annular recess therein to receive the ring 5. The ring 5 has thereon oppositely-extending projections 5', to which are pivotally attached one end of two links 6. The other end of the two links 6 are pivotally attached to adjustable bolts 7 in one arm of two angle or bell-crank levers 8. The two angle or bell-crank levers 8 are pivotally attached to oppositely-extending projections 9' on a collar 9, fast on the shaft 1. The other arms 8' of the two angle-levers 8 are pivotally attached to oppositely-extending arms 12' on the collar 12, loosely mounted on the shaft 1 and having an annular recess 12'' therein to receive the forked or yoke-shape end of the shipper-lever. (Not shown.) An arm 10 on the collar 9 extends into a recess in the ring 5 to hold said ring in the recess in the hub 4' of the pulley 4 and also to keep the ring in proper relative position with the collar 9.

The operation of my improvements in friction mechanism will be readily understood by those skilled in the art. Supposing the pulley 4 to be out of engagement with the plate 2, as shown in Fig. 2, and the friction mechanism in the position shown, the collar 12 is moved on the shaft 1 by the shipper-lever (not shown) in the direction of arrow *a*. The movement of the collar 12 rocks the angle-levers 8, which are pivotally supported on the stationary collar 9, in the direction of arrows *b* and moves the links 6 toward each other, causing the ring 5, engaging the hub 4' of the pulley 4, to move the pulley 4 on the shaft 1 toward and into engagement with the ring 2' on the friction-plate 2. When the links 6 and the arms of the angle-levers 8, to which they are pivotally attached, are in a substantially straight line or on dead-centers, as shown in Fig. 1, then the pulley 4 will be locked in frictional engagement with the plate 2. When the collar 12 is moved in the opposite direction, as indicated by arrow e, the pulley 4 is moved out of engagement with the ring 2' on the friction-plate 2.

It will be understood that the details of construction of my improvements may be varied, if desired.

Having thus described my invention, what I claim as new, and desire to secure by Letters Patent, is—

1. In a friction pulley mechanism, the combination with a shaft, a friction disk or plate, and a pulley, one of said parts being fast, and the other loose on said shaft, of means for positively moving said friction disk or plate and said pulley, into and out of frictional engagement, said means comprising a collar fast on said shaft, angle-levers pivotally attached to said collar, and having one arm thereof pivotally attached to links, and said links pivotally attached to a ring connected with the hub of said pulley, and the other arm of said angle-levers pivotally attached to a collar loose on said shaft, and said collar, adapted to have a sliding motion on said shaft, substantially as shown and described.

2. In a friction clutch mechanism, the combination with a shaft, a friction disk or plate, and a pulley, one of said parts being fast, and the other loose on said shaft, of means for positively moving said friction disk or plate, and said pulley, into and out of frictional engagement, said means comprising a collar fast on said shaft, and having oppositely-extending projections thereon, and an arm on said collar extending into a recess in a ring, and said ring extending in an annular recess in the hub of said pulley, and having oppositely-extending projections thereon, two links pivotally attached to said projections at one end, and pivotally connected with two angle or bell-crank levers at their other end, and said angle-levers, pivotally mounted on said projections on said stationary collar, and pivotally attached to the oppositely-extending arms on a collar loosely mounted on said shaft, and said collar, having an annular recess therein adapted to receive the end of a shipper-lever, substantially as shown and described.

3. In a friction clutch mechanism, the combination with a shaft, a friction disk or plate, and a pulley, one of said parts being fast, and the other loose on said shaft, of means for positively moving said friction disk or plate, and said pulley, into and out of frictional engagement, said means comprising a collar fast on said shaft, and having oppositely-extending projections thereon, and an arm on said collar extending into a recess in a ring, and said ring extending in an annular recess in the hub of said pulley, and having oppositely-extending projections thereon, two links pivotally attached to said projections at one end, and each pivotally connected at its opposite end to an adjustable bolt secured to one arm of an angle or bell-crank lever, and two angle or bell-crank levers pivotally mounted on said projections on said stationary collar, and pivotally attached to the oppositely-extending arms on a collar loosely mounted on said shaft, and said collar, having an annular recess therein adapted to receive the end of a shipper-lever, substantially as shown and described.

ARTHUR S. COWAN.

Witnesses:
 JOHN C. DEWEY,
 MINNA HAAS.